May 21, 1963
A. JOHNSON
3,090,348
SPEED AND FEED INDICATOR FOR MACHINE TOOLS
Filed March 25, 1960
4 Sheets-Sheet 1
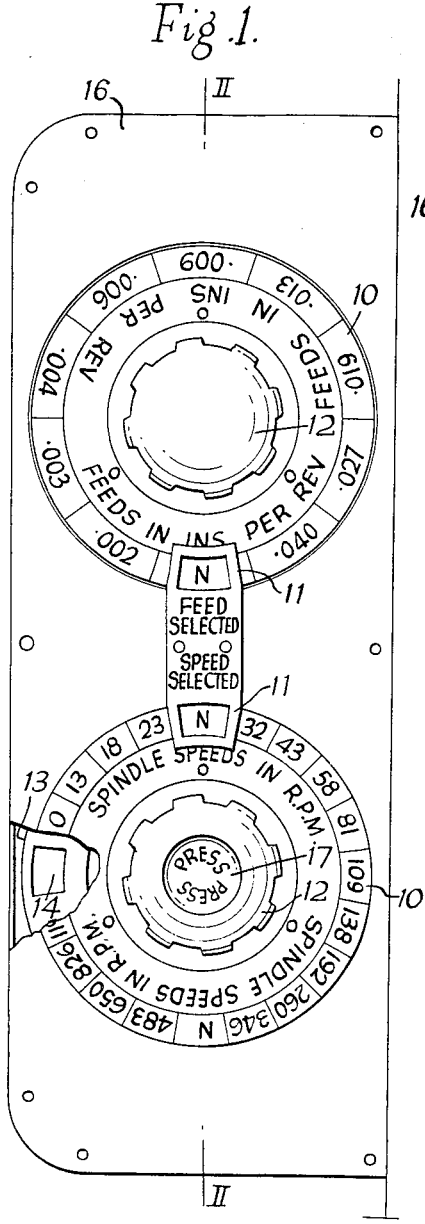
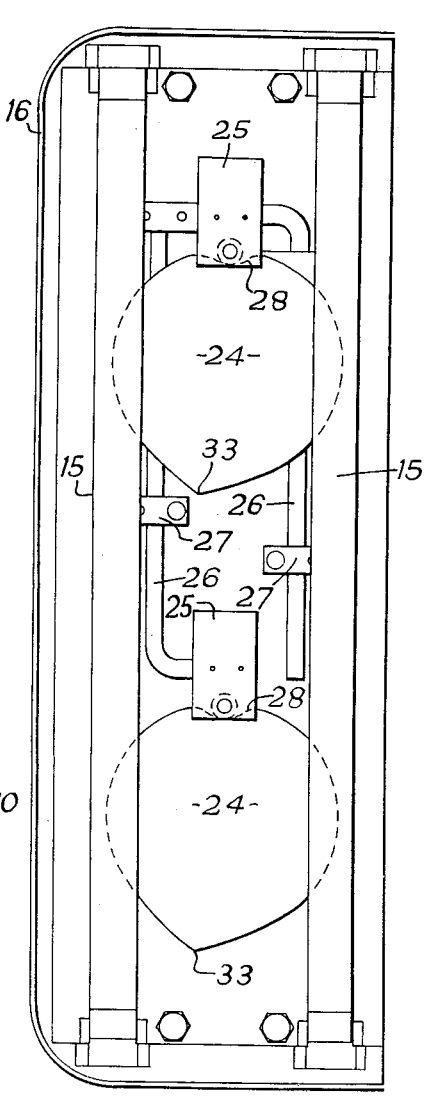
INVENTOR
Alfred Johnson
BY
ATTORNEY May 21, 1963 A. JOHNSON 3,090,348
SPEED AND FEED INDICATOR FOR MACHINE TOOLS
Filed March 25, 1960 4 Sheets-Sheet 2

INVENTOR
Alfred Johnson
BY Peter M. Brown
ATTORNEY

May 21, 1963  A. JOHNSON  3,090,348
SPEED AND FEED INDICATOR FOR MACHINE TOOLS
Filed March 25, 1960  4 Sheets-Sheet 3

INVENTOR
Alfred Johnson
BY Peter M. Doerry
ATTORNEY

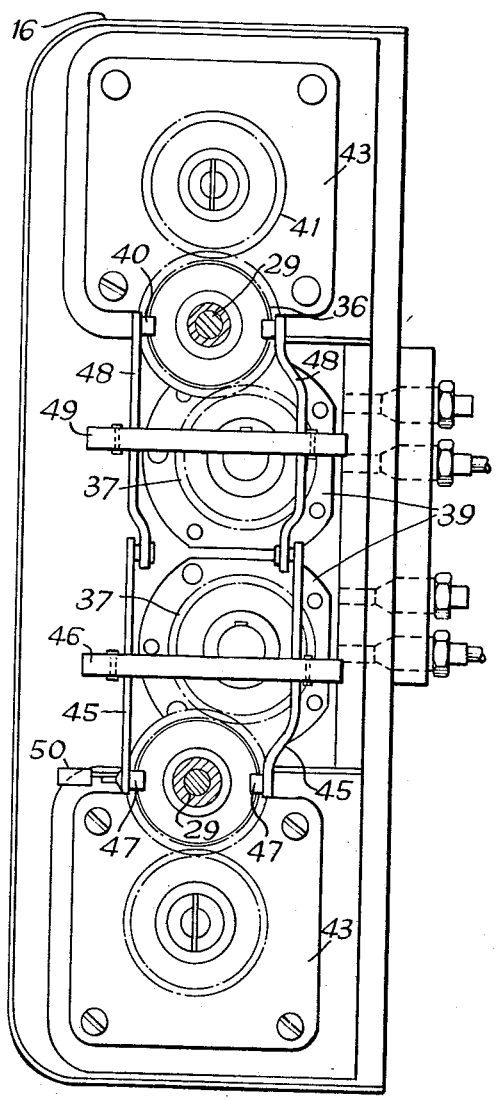

United States Patent Office 3,090,348
Patented May 21, 1963

3,090,348
SPEED AND FEED INDICATOR FOR
MACHINE TOOLS
Alfred Johnson, Halifax, England, assignor to William
Asquith Limited, Halifax, England, a company of Great
Britain
Filed Mar. 25, 1960, Ser. No. 17,583
7 Claims. (Cl. 116—124)

It is frequently desirable to provide means for indicating the speed at which a machine is operating, and when the speed is controlled by pre-selector gear mechanism, it is desirable that the indicator should show the actual speed which is in use at any time irrespective of any adjustments made to the pre-selector mechanism in preparation for a change of speed.

The present invention is designed to provide speed indicating means which is particularly applicable to a machine tool provided with pre-selector gear mechanisms controlling the speed and feed, e.g. the speed of rotation of a spindle and the rate of feed of a cutting tool.

According to the invention an indicator comprises a dial bearing a series of markings corresponding with different speeds, a first indicating means adapted to indicate a marking corresponding with a pre-selected speed, and a second indicating means adapted to indicate the speed which is operative at any time. Each indicating means preferably comprises a member having an aperture which can be aligned with any one of the markings, and preferably one of the indicating means is adapted to illuminate any one of the markings.

Figure 2A:
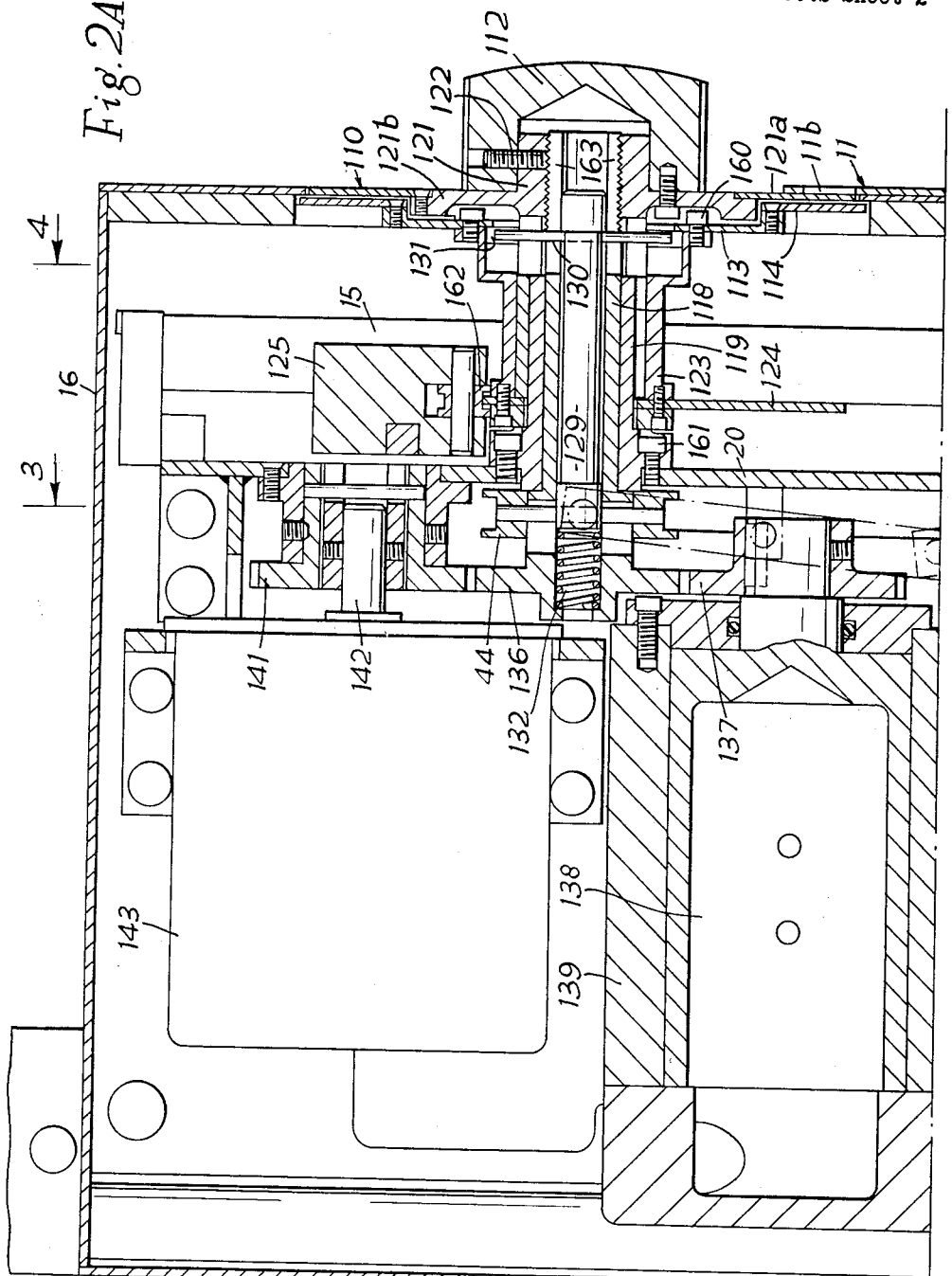
Figure 2B:
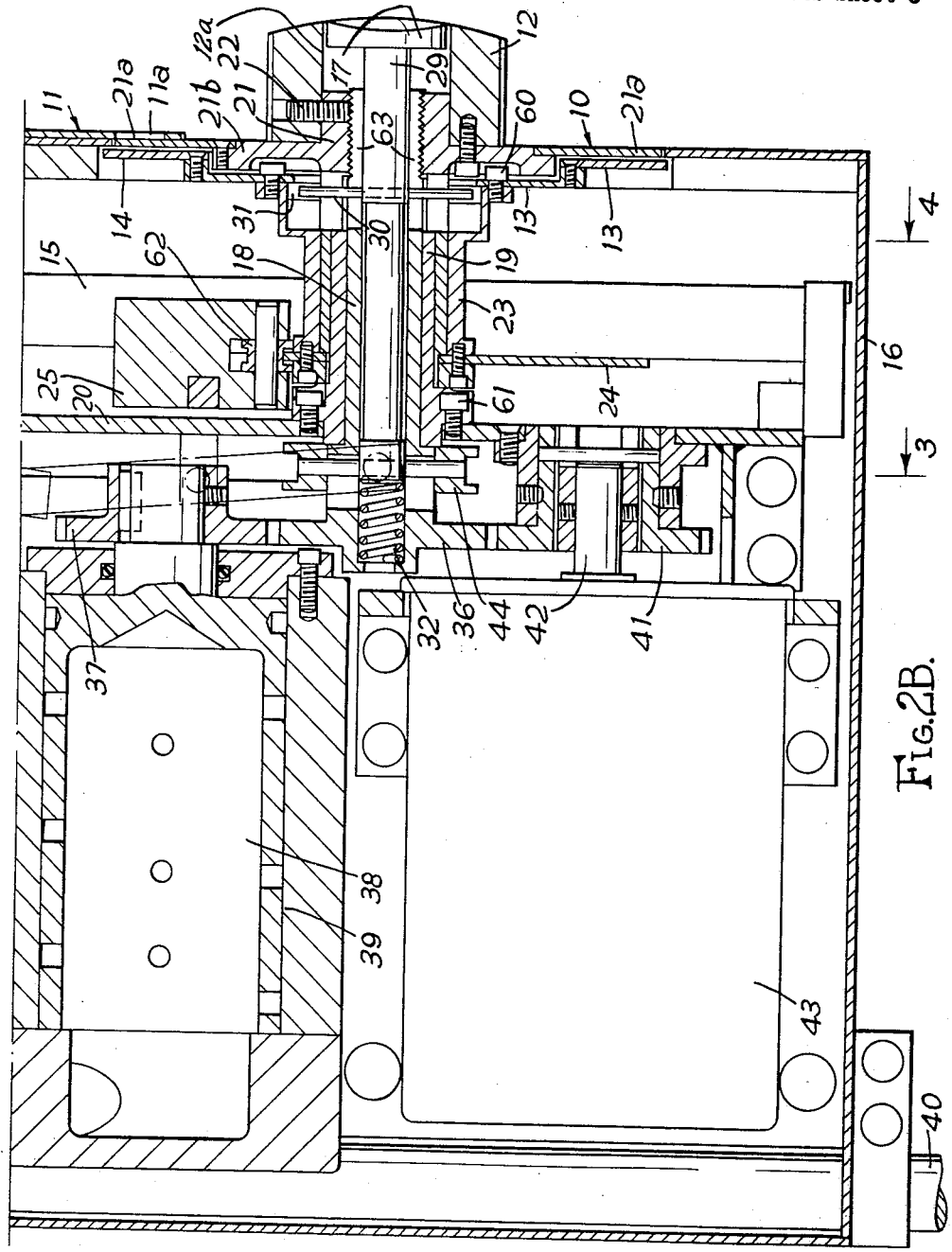

A combined speed and feed control unit for a machine tool incorporating indicating means according to the invention and having two dials, one bearing spindle speeds and the other bearing feed speeds, will now be described by way of example, with reference to the accompanying drawings, in which:

FIGURE 1 is a front view of the device, with one part broken away to show a member inside the outer cover FIGURE 2A is an enlarged sectional elevation on the line II—II of FIGURE 1, showing the top half of the device, FIG. 2B is an enlarged sectional elevation on the line II—II of FIGURE 1 showing the bottom half of the device FIGURE 3 is a sectional view on the line 3—3 in FIGURES 2A and 2B showing linkage connected between the mechanisms associated with the two dials, and FIGURE 4 is a sectional view on the line 4—4 in FIGURES 2A and 2B showing means for returning parts of the mechanism to zero positions Referring to the drawings, the device illustrated is intended to be applied to a machine tool having pre-selector gear mechanisms for both the spindle speed and the feed. The spindle speed indicator comprises a circular dial 10 bearing an annular series of speed markings and a marking (N) for the neutral position, at least that part of the dial bearing the markings being translucent, and the dial 10 being rotatable about its own axis. The indicating member comprises a stationary frame member 11 having apertures 11a and 11b so disposed that by rotating the dial 10 any one of the markings on the dial 10 can be aligned with the aperture 11a. The member 11 thus provides a first indicator means for the dial 10. A control member, in this instance a knob 12 is provided for rotating the dial 10, the knob 12 also serving for controlling the pre-selector mechanism (as will be hereinafter described). Consequently, the dial 10 will be moved to bring into alignment with the aperture 11a the dial marking corresponding with the gear or speed ratio to which the pre-selector mechanism is set by the knob 12. A ring 13 is rotatably mounted behind the dial 10, this ring having a single aperture 14 (shown aligned with the aperture 11a in FIGURE 2B) so that light from an electric lamp 15 disposed behind the ring 13 in a casing 16 enclosing the mechanism will pass through the aperture 14 to illuminate whichever marking in the dial 10 is aligned with the aperture 14, but the remainder of the ring acts as a light baffle so that the ring provides a second indicator means for the dial 10.

The operation of the parts so far described is as follows. The machine will be stopped when the gear mechanism is in neutral and consequently the neutral (N) marking of the dial 10 will be aligned with the indicator aperture 11a and also the ring 13 will be at its zero position in which its aperture 14 is in register behind the aperture 11a and consequently the "N" marking will be illuminated by the lamp 15. From this position the knob 12 is turned to rotate the dial 10 until the desired speed ratio marking is in register with the aperture 11a. The ring 13 rotates with the dial 10 and consequently the "N" marking will continue to be illuminated despite the fact that it has moved away from the aperture 11a, whilst the pre-selected gear ratio is now indicated by the aperture 11a. To engage the pre-selected gear ratio, a button 17 in the centre of the knob 12 is pressed by the operative whereupon the lamp 15 is extinguished, the ring 13 returns to its zero position with its aperture 14 in register with the aperture 11a and consequently with the selected gear ratio marking. The selected gear ratio is engaged and the lamp 15 is re-energised as soon as the said gear ratio is in engagement, so that the said gear ratio marking will be illuminated and will also be in register with the aperture 11a. It will be seen, therefore, that the marking corresponding with the gear ratio in operation will be illuminated continuously whilst the said gear ratio is in engagement.

The connections between the several parts to enable them to operate as set out above, will now be described having particular reference to FIGURE 2B. The frame member 11 is fixed on the casing 16 so that it overlies part of the dial 10 which is secured on a hollow spindle 18 rotatably mounted in a sleeve bearing 19 secured by screws 61 in an opening in an internal wall 20 of the casing 16. The dial 10 is made in two parts, comprising a hub portion 21 having a radial flange 21b on which the translucent annular portion 21a of the dial bearing the speed ratio markings is secured. The knob 12 is mounted on the hub portion 21 and these two members are locked on to the hollow spindle 18 by means of a set screw 22.

The ring 13 is fixed to a sleeve 23 which is rotatable on the sleeve bearing 19 by screws 60 and a heart shaped cam 24, see FIGURES 2B and 4, is secured on the inner end of the sleeve 23. A weight 25 has a runner 62 adapted to ride on the periphery of the cam 24, the weight being constrained to a vertical path by means of a vertical rod 26 projecting from the weight and slidable in guides 27 secured on the internal wall 20. The weight 25 therefore tends to rotate the cam 24 until its runner rests in the depression 28 of the cam, and when in this, the zero position, the aperture 14 in the ring 13 will be aligned with the aperture 11a.

The button 17 comprises a head on a plunger 29 which is slidable in the hollow spindle 18, the knob 12 having a central bore 12a to accommodate the button and permit access to the button. A pin 30 is passed diametrically through the plunger 29 and through axial slots 63 in the hollow spindle 18, so that the ends of the pin can engage with internal gear teeth 31 projecting from the sleeve 23 when the plunger is in its outermost axial position (as indicated in FIGURE 2B). The plunger is urged outwardly by means of a compression spring 32. When the button 17 is pressed the plunger 29 is moved axially against the pressure of the spring 32, and this moves the pin 30 out of engagement with the teeth 31. The pin 30 and the teeth 31 therefore serve as a clutch between the hollow spindle 18 and the ring 14, the clutch being disengageable by pressing the button 17 to displace the plunger 29 against the action of the spring 32. When the said clutch is engaged, rotation of the knob 12 will cause simultaneous rotation of the dial 10 and the ring 13 which are then locked together, and when the clutch is released, the ring 13 will be returned to its zero position by the action of the weight 25 on the cam 24. The high point 33 of the cam 24 is so disposed that when the weight 25 is resting on the said high point the dial 10 will be in a position in which the space between two dial markings will be aligned with the aperture 11a. Consequently, as the dial will always be adjusted to bring a speed ratio marking into register with the aperture 11a, the cam 24 will never be left at rest with the weight 25 resting on the high point 33, thus ensuring that when the button 17 is pressed to free the ring 13 and the cam 24 from the dial 10, the ring 13 will be rotated to its zero position by the weight.

It is arranged that when the knob 12 is rotated, a selector valve forming part of a hydraulic preselector mechanism will be adjusted to a setting corresponding to the gear ratio appropriate to the speed marking which at the same time is aligned with the indicator frame. For this purpose, a gear wheel 36 is secured on the inner end of the hollow spindle 18, this gear wheel 36 meshing with a gear wheel 37 operatively connected to a valve member 38 which is rotatable in a valve housing 39. The valve member 38 and housing 39 comprise a selector unit of known kind which has a series of ports connected to the exhaust ports of hydraulic cylinders which effect the gear change, so that the hydraulic cylinders will operate in accordance with the selector valve ports that are opened by the valve member 38. The gear wheel 36 also meshes with a gear wheel 41 secured on the operating spindle 42 of a rotary electric selector switch 43 interposed in electrical connections to the electric motor which drives the machine. It will be seen that both the selector valve and the selector switch 43 will be adjusted simultaneously so that for each speed ratio on the dial 10, there is corresponding combination of settings of the selector valve and selector switch. The selector valve and the selector switch may be of any convenient type normally used for controlling the speed of a machine, and similarly the gear change mechanism and the driving motor are such as are normally used on machine tools and as they form no part of the present invention it is not necesary to describe and illustrate them.

The indicator mechanism so far described is for the spindle speed of a machine tool, but in this particular example the indicator also has a dial and associated mechanism for the feed speeds of the machine. The feed speed indicator is illustrated in the upper part of FIGURE 1 and in FIGURE 2A and is largely a duplication of the spindle speed indicator arrangement. The feed speed indicator comprises a circular dial 110 being an annular series of feed speed markings and a marking (N) for the neutral position, at least that part of the dial bearing the markings being translucent, and the dial 110 being rotatable about its own axis. The indicating member 11 has its aperture 11b so disposed that by rotating the dial 110 any one of the markings on the dial 110 can be aligned with the aperture 11b. The member 11 thus provides a first indicator means for the dial 110.

A control member, in this instance a knob 112 is provided for rotating the dial 110, the knob 112 also serving for controlling the pre-selector mechanism (as will be hereinafter described). Consequently, the dial will be moved to bring into alignment with the aperture 11b the dial marking corresponding with the gear ratio to which the pre-selector mechanism is set by the knob 112. A ring 113 is rotatably mounted behind the dial 110, this ring having a single aperture 114 (shown aligned with the aperture 11b in FIGURE 2A) so that light from the electric lamp 15 will pass through the aperture 114 to illuminate whichever marking on the dial 110 is aligned with the aperture 114, but the remainder of the ring acts as a light baffle so that the ring provides a second indicator means for the dial 110.

The operation of the feed speed indicator is as follows. There will be no feed applied to the workpiece or to the tool, when the gear mechanism is in neutral, and consequently the neutral (N) marking of the dial 110 will be aligned with the indicator aperture 11b, and also the ring 113 will be at its zero position in which its aperture 114 is in register behind the aperture 11b, and consequently, the "N" marking will be illuminated by the lamp 15. From this position the knob 112 is turned to rotate the dial 110 until the desired feed speed ratio marking is in register with the aperture 11b. The ring 113 rotates with the dial 110 and consequently, the "N" marking will continue to be illuminated despite the fact that it has moved away from the aperture 11b, whilst the preselected gear ratio is now indicated by the aperture 11b. To engage the pre-selected gear ratio, a plunger 129 in the centre of the knob 112 is moved axially by a linkage with the plunger 29 in the speed indicator mechanism previously described, whereupon the lamp 15 is extinguished, the ring 113 returns to its zero position with its aperture 114 in register with the aperture 11b, and consequently with the selected gear ratio marking. The selected gear ratio is engaged and the lamp 15 is reenergised as soon as the said gear ratio is in engagement, so that the said gear ratio marking will be illuminated and will also be in register with the aperture 11b. It will be seen, therefore, that the marking corresponding with the gear ratio in operation will be illuminated continuously whilst the said gear ratio is in engagement.

The connections between the several parts to enable them to operate as set out above, will now be particularly described with reference to FIGURE 2A.

The frame member 11 is fixed on the casing 16 so that it overlies part of the dial 110 which is secured on a spindle 118 rotatably mounted in a sleeve bearing 119 secured by screws 161 in an opening in the internal wall 20 of the casing 16. The dial 110 is made in two parts, comprising a hub portion 121 having a radial flange 121b on which the translucent annular portion 121a of the dial bearing the feed speed ratio markings is secured. The knob 112 is mounted on the hub portion 121 and these two members are locked on to the hollow spindle 118 by means of a set screw 122.

The ring 113 is fixed to a sleeve 123 which is rotatable on a sleeve bearing 119 by screws 160, and a heart shaped cam 124 (see FIGURES 2A and 4), is secured on the inner end of the sleeve 123. A weight 125 has a runner 162 adapted to ride on the periphery of the cam 124, the weight being constrained to a vertical path by means of a vertical rod 126 projecting from the weight and slidable in guides 127 secured on the internal wall 20. The weight 125, therefore, tends to rotate the cam 124 until its runner rests in the depression 128 of the cam, and when in this, the zero position the aperture 114 in the ring 113 will be aligned with the aperture 11b.

The plunger 129 is slidable in the hollow spindle 118. A pin 130 is passed diametrically through the plunger 129 and through axial slots 163 in the hollow spindle 118, so that the ends of the pin can engage with internal gear teeth 131 projecting from the sleeve 123 when the plunger is in its outermost axial position (as indicated in FIGURE 2A). The plunger is urged outwardly by means of a compression spring 132. When the plunger 129 is moved axially against the pressure of the spring 132, the pin 130 is moved out of engagement with the teeth 131. The pin 130 and the teeth 131 therefore serve as a clutch between the hollow spindle 118 and the ring 114, the clutch being disengageable by axial movement of the plunger 129 against the action of the spring 132. When the said clutch is engaged, rotation of the knob 112 will cause simultaneous rotation of the dial 110 and a ring 113 which are then locked together, and when the clutch is released, the ring 113 will be returned to its zero position by the action of the weight 125 on the cam 124. The high point 133 of the cam 124 is so disposed that when the weight 125 is resting on the said high point the dial 110 will be in a position in which the space between two dial markings will be aligned with the aperture 11b. Consequently, as the dial will always be adjusted to bring a feed speed ratio marking into register with the aperture 11b, the cam 124 will never be left at rest with the weight 125 resting on the high point 133, thus ensuring that when the plunger 129 is moved to free the ring 113 and the cam 124 from the dial 110, the ring 113 will be rotated to its zero position by the weight.

It is arranged that when the knob 112 is rotated, a selector valve forming part of a hydraulic preselector mechanism will be adjusted to a setting corresponding to the gear ratio appropriate to the feed marking which at the same time is aligned with the indicator frame. For this purpose, a gear wheel 136 secured on the inner end of the hollow spindle 118, this gear wheel 136 meshing with the gear wheel 137 operatively connected to a valve member 138 which is rotatable in a valve housing 139. The valve member 138 and the housing 139 comprise a selector unit of known kind which has a series of ports connected to the exhaust ports of hydraulic cylinders which effect the gear change, so that the hydraulic cylinders will operate in accordance with selector valve ports that are opened by the valve member 138. The gear wheel 136 also meshes with a gear wheel 141 secured on the operating spindle 142 of the rotary electric selector switch 143 interposed in eelctrical connections to the electric motor which drives the feed mechanism of the machine. It will be seen that both the selector valve and the selector switch 143 will be adjusted simultaneously so that for each feed speed ratio on the dial 110, there is a corresponding combination of settings of the selector valve and the selector switch. The selector valve and the selector switch may be of any convenient type normally used for controlling the speed of a machine, and similarly the gear change mechanism and the driving motor are such as are normally used on machine tools and as they form no part of the present invention it is not necessary to describe and illustrate them. The plungers 29 and 129 of the two indicators are interconnected by lever mechanism so that when the button 17 is pressed, the two plungers will be displaced simultaneously. For this purpose a double flanged ring 44 is slidably mounted on the inner end portions of the hollow spindles 19 and 119 and a diametrically disposed pin through each ring 44 extends through a slot in each of the spindles 19 and 119 and through the inner end of the plungers 29 and 129. The lever mechanism is shown in full lines in FIGURE 3 and in chain dotted lines in FIGURES 2A and 2B and comprises a pair of levers 45 pivoted on a bracket 46, the lower end of each lever having a peg 47 engaging between the flanges of the lower ring 44, and the upper ends of the levers 45 being pivoted to the lower ends of a pair of upper levers 48. The upper levers 48 are pivoted on a bracket 49 and the upper end of each lever 48 has a peg 40 engaging between the flanges of the upper ring 44.

A micro switch 50 is adapted to be actuated when the button 17 is pressed, and for this purpose the switch 50 is mounted adjacent to the lower end of one of the lower levers 45 so that when the button 17 is pressed the lower end of the lever 45 will ride past and actuate the switch 50. When the button is released and the plunger 29 is returned to its normal position by the spring 32, the lower end of the lever will move away from the switch 50 to allow the latter to resume its normal setting.

The gear change mechanism, the electrical mechanism and the hydraulic mechanism employed for effecting a gear change form no part of the present invention which is concerned with indicating means and their connection to the control valves and switches of the said mechanisms. The selector valve and the selector switch are adjusted by movement of the knob 12 as hereinbefore described, this serving as a pre-selection without affecting the gear ratio which is in operation, because at this time liquid under pressure is not supplied to the gear change operating cylinders and the circuit including the selector valve is not closed. However, when the button 17 is pressed, the micro-switch 50 will be actuated so as to cause a motor brake to be applied and at the same time bring a governor switch into the circuit, as well as de-energising the electric lamp 15. When the speed of the motor falls to a pre-determined speed for which the governor switch is set, this switch causes energisation of a solenoid operated valve to supply fluid under pressure to the gear change mechanism, and releases the motor brake. The gear change mechanism is then adjusted according to the setting of the selector valve, and the current will be restored to the motor provided the gear change has been completed and contacts closed thereby corresponding with the setting of the selector switch 43. At the same time the lamp 15 will be energised to illuminate the speed ratio marking of the dial aligned with the indicator frame and the aperture 14 in the ring 13, which latter was returned to its zero position when the button 17 was pressed. The motor will then continue to run at its normal speed and the illumination provided by the lamp 15 will indicate that the gear change has been effected.

It will be seen that the indicator mechanism provides a convenient means for actuating the pre-selector controls, and that when a speed ratio has been selected by turning the knob 12, it is only necessary to press the button 17 to cause the selected gear to be engaged. The indicator will then provide visual indication when the gear change has been effected and will indicate the gear ratio in operation continuously until a different gear change is initiated.

It will be appreciated that the indicator means for the feed speeds illustrated in the upper portion of FIGURE 1 and in FIGURE 2A functions in the same way as the speed change indicator means, in conjunction with the motor and change speed gear provided for the feed speed. Consequently, a feed speed can be pre-selected on the upper dial and the said pre-selected feed speed will be engaged when the button 17 is pressed. It will also be understood that speeds and feeds can be pre-selected on both dials and both changes will be effected when the button 17 is pressed. Furthermore, additional indicator and pre-selector means could be provided for other drives, all being interconnected in the same way as the speed and feed controls described, so that by pressing a single button, a gear change will be effected according to the pre-selected setting of any or all of the dials.

It will be understood that the indicating mechanism may be modified according to the machine with which it is to be used. Furthermore, if desired, remote control means may be provided for actuating the knobs 12 and 112 and the button 17. Any convenient remote control means such as the well known electric follow up or step by step mechanism may be used. It will also be understood that instead of the markings on the dial 10 being speed ratios, any convenient symbols may be used, and as shown in FIGURE 1, all the markings on the dial 10 are visible at all times.

Instead of the pin 30 and teetch 31 clutch arrangement actuated mechanically by the plunger 29, any other convenient clutch arrangement may be used. For example, the clutch may be electro-magnetically operable when a switch is closed by the plunger 29, and such a switch may serve the dual purpose of controlling the clutch and also act in the same way as the micro-switch 50. If both indicating means employ electro-magnetic clutches, then the interconnecting lever mechanism can be omitted, as the two clutches can be interconnected electrically.

What is claimed is:

1. In a change gear control mechanism for use with a machine tool having a preselector unit for determining the gear ratio, a control unit for determining the time of change in the gear ratio and a dial being rotatably mounted and having markings, a fixed indicating member adjacent to said dial, means for manually rotating said dial relative to said fixed indicating member bringing any one of said markings on said dial into alignment with said fixed indicating member, means connecting said dial to said preselector unit so that movement of said dial changes the setting of said preselector unit, rotatably mounted indicating means, locking means locking said indicating means to said dial for movement therewith, means activated with said control unit disconnecting said locking means when said control unit is operated, and means rotating said rotatably mounted indicating means to a given position in relation to said fixed indicating member when said locking means is disconnected.

2. The combination according to claim 1 in which the fixed indicating member comprises a stationary frame overlying part of the dial.

3. The combination according to claim 1 in which said means rotating said rotatably mounted indicating means when said locking means is disconnected comprises a rotary cam rigidly connected to said rotatably mounted indicating means and a weighted cam follower riding on said rotary cam.

4. The combination according to claim 3 in which the said locking means comprises a clutch joining said rotatably mounted indicating means and said dial.

5. In a change gear control mechanism for use with a machine tool having a preselector unit for determining the gear ratio and a control unit for determining the time of changing the gear ratio; a dial being rotatably mounted and having markings, said dial in the area of said markings being translucent, a fixed indicating member adjacent to said dial, means for manually rotating said dial relative to said fixed indicating member bringing any one of said markings on said dial into alignment with said fixed indicating member, means connecting said dial to said preselector unit so that movement of said dial changes the setting of said preselector unit, a light source behind said dial, rotatably mounted indicating means containing an aperture and located behind said dial, light from said light source passing through the aperture in said indicating means and indicating a marking on said dial, locking means locking said indicating means to said dial for rotation therewith, means activated by said control unit disconnecting said locking means when said control unit is operated, and means rotating said rotatably mounted indicating means bringing the aperture in said indicating means adjacent to said fixed indicating member when said locking means is disconnected.

6. The combination according to claim 5 wherein said locking means locking said indicating means to said dial for movement therewith comprises a clutch locking said rotatably mounted indicating means to said dial for rotation therewith, a spring urging said clutch into engagement, and a plunger opposed to said spring, said spring being compressed and said clutch being disengaged upon axial movement of said plunger, said plunger activating the control unit of a machine tool.

7. In a change gear control mechanism for use with a machine tool having first and second preselector units for determining gear ratios and a control unit for determining the time of change of the gear ratios; first and second dials being rotatably mounted and having markings, said dials being translucent in the area of said markings, a fixed indicating member adjacent to each of said dials, means for manually rotating each of said dials relative to said fixed indicating members bringing any one of said markings on each dial into alignment with a fixed indicating member, means connecting said first dial to said first preselector unit so that movement of said first dial changes the setting of said first preselector units, means connecting said second dial to said second preselector unit so that movement of said second dial changes the setting of said second preselector unit, rotatably mounted indicating means behind each of said dials, each rotatably mounted indicating means containing an aperture, a light source behind said dials, light from said light source passing through the apertures in said rotatably mounted indicating means illuminating markings on each of said dials, locking means locking each of said indicating means to one of said dials for movement therewith, means activating said control unit, said means activating said control unit disconnecting said locking means when said control unit is operated, and means rotating each of said rotatably mounted indicating means placing the apertures in said rotatably mounted indicating means in a position relative to said fixed indicating members when said locking means are disconnected.

References Cited in the file of this patent

UNITED STATES PATENTS

| | | |
|---|---|---|
| 2,330,426 | Hoelscher | Sept. 28, 1943 |
| 2,336,163 | Bullard et al. | Dec. 7, 1943 |